(12) United States Patent
Wexler et al.

(10) Patent No.: US 8,079,695 B2
(45) Date of Patent: Dec. 20, 2011

(54) INKJET INKS HAVING IMPROVED PRINT UNIFORMITY

(75) Inventors: Allan Wexler, Pittsford, NY (US); David J. Giacherio, Rochester, NY (US); Michael J. Carmody, Webster, NY (US); Richard C. Reem, Hilton, NY (US); Yongcai Wang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 508 days.

(21) Appl. No.: 12/194,983

(22) Filed: Aug. 20, 2008

(65) Prior Publication Data
US 2010/0045759 A1    Feb. 25, 2010

(51) Int. Cl.
   *C09D 11/00* (2006.01)
(52) U.S. Cl. .................................. 347/100; 106/31.13
(58) Field of Classification Search .................. 347/100; 106/31.13
See application file for complete search history.

(56) References Cited

U.S. PATENT DOCUMENTS

| | | | |
|---|---|---|---|
| 6,613,134 B1* | 9/2003 | Azuma | 106/31.27 |
| 6,786,588 B2* | 9/2004 | Koyano et al. | 347/100 |
| 2001/0020055 A1* | 9/2001 | Ishizuka et al. | 523/161 |
| 2002/0012035 A1* | 1/2002 | Mouri et al. | 347/100 |
| 2004/0102541 A1* | 5/2004 | Sacoto et al. | 523/160 |
| 2004/0257418 A1* | 12/2004 | Doi | 347/100 |
| 2005/0249925 A1 | 11/2005 | Ikegami et al. | |
| 2006/0146087 A1 | 7/2006 | Sato et al. | |
| 2007/0052785 A1* | 3/2007 | Itoh et al. | 347/101 |
| 2009/0311425 A1* | 12/2009 | Tsubaki et al. | 427/256 |

FOREIGN PATENT DOCUMENTS

| | | |
|---|---|---|
| WO | WO 00/37542 A | 6/2000 |
| WO | WO 03/014237 A1 | 2/2003 |
| WO | WO 2006/082158 A1 | 8/2006 |
| WO | WO 2006107112 A1 * | 10/2006 |

OTHER PUBLICATIONS

Harry J. Spinelli: "Polymeric Dispersants in Ink Jet Technology", Advanced Materials, vol. 10, No. 15, 1998, pp. 1215-1218, XP002549350.

* cited by examiner

*Primary Examiner* — Laura Martin
(74) *Attorney, Agent, or Firm* — Arthur E. Kluegel; Andrew J. Anderson

(57) ABSTRACT

An inkjet printer, includes an ink containing a print uniformity improving polymer obtained by chain copolymerizing at least the following ethylenically unsaturated monomers:
(a) a first monomer having a lowest pKa value greater than 3 and comprising a carboxylic acid group;
(b) a second monomer having a lowest pKa value less than 2; and
(c) a hydrophobic third monomer;
together with pigment particles that are self-dispersed or dispersed with a dispersant other than a print uniformity improving polymer, and water. Such an ink provides improve print uniformity.

21 Claims, 3 Drawing Sheets

INKJET INKS HAVING IMPROVED PRINT UNIFORMITY

FIELD OF THE INVENTION

The invention relates generally to the field of inkjet inks, and in particular to inkjet printer and pigment ink compositions that exhibit improved print uniformity.

BACKGROUND OF THE INVENTION

Images produced using dye-based inks from an inkjet printer have achieved photographic quality results in recent years. However, dye-based images are known to suffer from limitations in image stability from a durability and image permanence (light and ozone fade) standpoint. Images produced using pigment-based inks are generally much better for image permanence than dye-based inks; however, images formed from pigment-based inks are more challenged from a durability and print uniformity standpoint than dye-based inks.

Print uniformity issues of particular concern are gloss-banding and mottle. Bidirectional printing of pigment ink images often results in a non-uniform image which has the appearance of bands of alternating gloss when the image is viewed at near the specular angle. This phenomenon is herein referred to as gloss-banding and is detrimental to the overall quality of the image. Another aspect of print uniformity is uniform density or absence of visual print mottle. That is, a target printed with a uniform given nominal density should be free of visually observable variations in print density. A metric for visible variations in print density is the standard deviation of a set of L* values of about 400 micron square areas within the target. The smaller the standard deviation the smoother or more uniform is the apparent print density.

When jetted onto porous glossy inkjet recording media, pigment ink components, including the pigment dispersions and attendant polymers, are filtered at the surface of the media. The gloss-banding image artifact derives from differences in light scatter off the newly created surface formed by the jetted ink. There are many asymmetries in overlap printing or bidirectional printing that can give rise to surfaces that scatter light differently. One such asymmetry is the number of nozzles used within a given raster line. An approach to suppressing gloss-banding that has been disclosed (US Publication No. 2007/0008364) is to select a print mode where the number of dots per unit area is small, as noted however this causes another artifact, density variation banding. A print mode specifies the amount of each color ink to print to reproduce the desired color, as well as the number of passes of the printhead over the recording medium in which to deposit the ink, and the amount and pattern of each ink to be printed on each pass of the printhead. Other print mode solutions to the problem which may address the asymmetries include printing in only one direction, or increasing the number of passes required to deposit the ink, or by changing the order of printing of the colorants. Each of these approaches will decrease productivity, or change the ink flux which can contribute to other artifacts, such as mottle. In addition, a print mode which is successful in producing a uniform surface on one recording medium may not be successful on another recording medium. Ideally, a method of gloss-band suppression which is not dependent on the particular print mode would be preferred.

As noted, there are many asymmetries arising from bidirectional printing that can result in different surface structures and consequent light scattering properties in the bands. One particular asymmetry is the age of the surface created by previously deposited drops as the head traverses along subsequent print rasters. The appearance of bands of alternating gloss (hazy light scattering bands alternating with glossy light reflective bands) are particularly strong along the edges of the image. Further, within each band the polarity changes from glossy to hazy across the raster. This suggests that the time scale responsible for the phenomena is on the order of a head traverse, and thus consistent with the known kinetics of pH dependent carboxylate containing polymer conformational transitions. These transitions convert hydrophilic polymers into hydrophobic polymers reducing the wettability and permeability of the filtered pigment polymer image layer. Carboxylate containing polymers are none the less very useful ink adjuvants that can serve many functions in an inkjet ink, including serving as binders for the pigment image and jetting aids. The composition of these polymers must balance the contrasting requirements for aqueous dispersibility in the alkaline ink with the requirement for water-fastness of the pigment image on the media surface. Thus, copolymers comprising a carboxylate monomer for aqueous dispersibility, and a hydrophobic monomer for water-fastness are generally employed. Accordingly, it would be very useful to have ink compositions that contain print uniformity improving polymers that, by resisting the aforementioned transitions, are capable of suppressing gloss-banding artifacts.

Print uniformity is also a function of the evenness of printed ink density across the surface of the image. In an ideal case, each ink droplet is jetted to the image recording medium such that the drops penetrate the permeable medium surface, spread across the medium, and joined together to create a uniform image density. In bi-directional printing this is rarely the case. In reality the random placement of droplets, permeability of drops placed onto previously fired drops, inhomogeneity of the recording medium surface, surface tensions of the inks, presence of pigment particles in the ink, and capacity of the medium to absorb liquid all can affect the evenness of the printed ink density across the image. Each of these factors can contribute to an uneven density across the image that has the appearance of mottle to the observer. In some cases the mottle can be ascribed to density variations on the order of about 400 microns on the recording medium surface. Undesirable conditions can exist between the ink and recording medium whereby a significant number of ink droplets merge or coalesce prior to penetration into the image recording medium surface. This droplet coalescence can be a particular problem for pigmented inks since the printed pigment particles reside at or near the surface of the image recording medium thereby amplifying the unevenness in printed ink density. The coalescence of ink droplets on the recording medium can result in a mottled appearance which is highly objectionable to the observer. The present inventors have discovered that the presence of certain print uniformity improving polymers in pigmented inks can greatly minimize the mottle and improve the overall evenness of the printed ink density.

It would be desirable to have a pigment-based ink that can be printed with reduced gloss-banding and mottle. It is further desirable to provide a pigment ink that can be printed using an inkjet printer to a medium having a wide range of surface pH without gloss-banding or mottle. A yet further desire, is a pigment-based ink that does not gloss band or show mottle over a range of print modes.

SUMMARY OF THE INVENTION

The present invention is directed toward overcoming one or more of the problems set forth above. Briefly summarized, the invention provides an inkjet printer, comprising an ink containing:

A) a print uniformity improving polymer obtained by chain copolymerizing at least the following ethylenically unsaturated monomers:
  (a) a first monomer having a lowest pKa value greater than 3 and comprising a carboxylic acid group;
  (b) a second monomer having a lowest pKa value less than 2; and
  (c) a hydrophobic third monomer;
B) pigment particles that are self-dispersed or dispersed with a dispersant other than a print uniformity improving polymer, and
C) water.

The invention also provides an ink composition and an inkjet printing method employing the ink composition. The invention provides improved print uniformity particularly with respect to gloss-banding and mottle.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
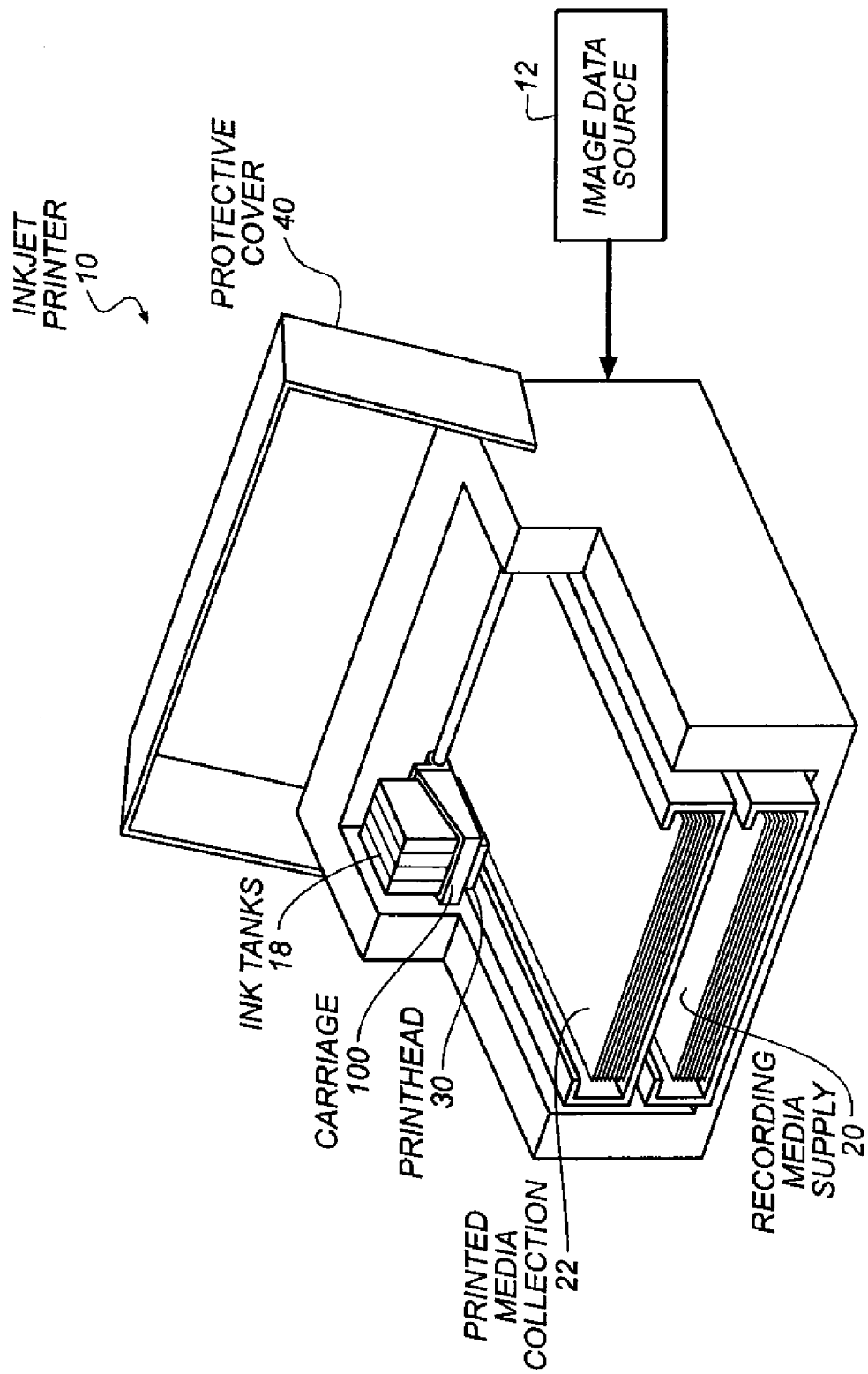
FIG. 1 is a schematic view of an inkjet printer useful in the invention.

The invention is summarized above. The inkjet inks of the present invention are aqueous-based inks. Aqueous-based is defined herein to mean the ink comprises mainly water as the carrier medium for the remaining ink components. The pigment-based inks of the present invention comprise pigment particles dispersed in the aqueous carrier and at least one print uniformity improving polymer as described above.

The term "pKa" used herein is defined as the negative logarithm of the acid dissociation constant (Ka) of an acid. The acid dissociation constant, Ka, is defined as $[H^+][A^-]/[HA]$, wherein [HA] denotes the concentration of undissociated acid, HA, in a solution and, $[H^+]$ and $[A^-]$ denote the concentrations of dissociated hydrogen ion, $H^+$, and anion, $A^-$, thereof in the solution. Consequently, the value of pKa can be obtained from the equation: $pKa=-\log[H^+]-\log([A^-]/[HA])=pH-\log([A^-]/[HA])$. In the present invention, pKa does not describe the polymer itself, but rather any ionizable polymerizable monomer used to prepare the polymer.

The print uniformity improving polymer of the present invention is obtained by copolymerizing at least one first ethylenically unsaturated monomer having a lowest pKa greater than 3 and comprising a carboxylic acid group with additional monomers described herein. In one exemplary embodiment the first monomer comprising a carboxylic acid group has a lowest pKa value greater than 4. The monomer useful as the first ethylenically unsaturated monomer comprising a carboxylic acid can be a mono carboxylic acid or a dicarboxylic acid. In the case of a dicarboxylic acid, a pKa value exists for each carboxylic acid group and the lowest pKa value is greater than 3. Examples of monomers useful as the first monomer include, but are not limited to, acrylic acid, methacrylic acid, fumaric acid, crotonic acid, itaconic acid, ethacrylic acid, mesaconic acid, cinnamic acid, carboxyethyl acrylate, carboxymethylacrylate, α-chloro-acrylic acid, and combinations thereof. Desirably, the first monomer is acrylic acid or methacrylic acid. The first monomer comprising a carboxylic acid group is typically polymerized at from 20 to 75 weight percent based on the total weight of the monomers used in the chain copolymerization, and more desirably from 20 to 50 weight percent. A particularly useful amount of first monomer comprising a carboxylic acid group used to prepare the polymer is from 20 to 35 weight percent of the total monomers.

The print uniformity improving polymer of the present invention is obtained by copolymerizing a second ethylenically unsaturated monomer having a pKa value less than 2 with additional monomers defined herein. Examples of monomers useful as the second monomer include, but are not limited to, sulfonic acid group containing monomers. Sulfonic acid group containing monomers useful as the second monomer include, but are not limited to, 2-acrylamido-2-methyl propane sulfonic acid ('AMPS'), vinyl sulfonic acid, (meth)allyl sulfonic acid, styrene sulfonic acid, (meth)allyloxybenzene sulfonic acid, 2-propenoic acid, 2-methyl-,3-sulfopropyl ester, 1-allyloxy 2 hydroxy propyl sulfonic acid, and combinations thereof. The second monomer is typically polymerized at from 5 to 50 weight percent based on the total weight of the monomers used in the chain copolymerization, and more desirably from 20 to 50 weight percent. A particularly useful amount of second monomer used to prepare the polymer is from 10 to 25 weight percent of the total monomers in the chain polymerization.

Typical values for the pKa of monomers useful in the present invention can be found in Lange's Handbook of Chemistry, $14^{th}$ Edition and the CRC Handbook of Chemistry, $84^{th}$ Edition. Optionally, a predicted pKa value for the monomer can be used to determine the relationship between first and second monomers and is available using Advanced Chemistry Development (ACD/LABS) Software. Values contained herein using the ACD/LABS software are reported using version 8.14 for SOLARIS® ACD/LABS and are available using SCIFINDER® American Chemical Society software.

Typical pKa values for acid group containing monomers are given in Table 1. In the case of monomers having di-carboxylic acid groups, the lowest pKa value (the pKa value of the most readily ionizable acid group) is given.

TABLE 1

MEASURED AND PREDICTED PKA VALUES
FOR ACID GROUP CONTAINING MONOMERS

| Acid monomer | Monomer type | pKa |
| --- | --- | --- |
| Acrylic acid | first | 4.3 |
| Methacrylic acid (MA) | first | 4.7 |
| trans-crotonic acid | first | 4.6 |
| trans-chloroacrylic acid | first | 3.7 |
| trans-cinnamic acid | first | 4.4 |
| Itaconic acid | first | 3.8 |
| α-chloroacrylic acid | first | 3.3 |
| Fumaric acid | first | 3.1 |
| Mesaconic acid | first | 3.1 |
| Vinyl sulfonic acid | second | −2.7 |
| Allyl sulfonic acid | second | 1.5 |
| Methyl allyl sulfonic acid | second | 1.4 |
| 2-propenoic acid, 2-methyl-, 2-sulfoethyl ester | second | 1.0 |
| 2-acrylamido-2-methylpropane sulfonic acid (AMPS) | second | 1.7 |

The print uniformity improving polymer of the present invention is obtained by copolymerizing at least one hydrophobic third monomer with the ionizable monomers defined herein. Suitable hydrophobic monomers are, in principle, all hydrophobic monomers having a water-solubility of less than 60 g/l at 25° C., and which are copolymerizable with the ionizable monomers of the present invention. They include, in particular, the $C_1$-$C_{21}$-alkyl esters of monoethylenically unsaturated $C_3$-$C_6$ carboxylic acids, especially the esters of acrylic and methacrylic acid with $C_1$-$C_{21}$-alkanols or $C_5$-$C_{10}$ 4-cycloalkanols such as methanol, ethanol, n-propanol, iso-propanol, n-butanol, isobutanol, 2-butanol, tert-butanol, n-pentanol, n-hexanol, 2-ethylhexan-1-ol, n-octanol, n-decanol, n-dodecanol, n-tridecanol, n-tetradecanol, n-hexadecanol, n-stearyl alcohol, n-behenyl alcohol, 2-propylheptan-1-ol, cyclohexanol, 4-tert-butylhexanol, 2,3,5-trimethylcyclohexanol, benzyl alcohol, phenyl alcohol, or phenylethyl alcohol. Further suitable non-ionizable hydrophobic monomers are the di-$C_1$-$C_{21}$-alkyl esters of ethylenically unsaturated dicarboxylic acids, such as maleic, fumaric, or itaconic acid, with the abovementioned $C_1$-$C_{21}$-alkanols or $C_5$-$C_{10}$-cycloalkanols, examples being dimethyl maleate or di-n-butyl maleate. Vinlyaromatic compounds such as styrene, α-methyl styrene, t-butyl styrene, ethylstyrene, isopropylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy) styrene, methoxystyrene, 4-methoxy-3-methylstyrene, dimethoxystyrene, chlorostyrene, dichlorostyrene, trichlorostyrene, bromostyrene, and vinyl toluene are also suitable as non-ionizable hydrophobic monomers, and their aromatic ring may be unsubstituted or substituted by one or more substituents selected from $C_1$-$C_{10}$-alkyl, halo, especially chloro, and/or hydroxyl, which in its turn may also be ethoxylated. The non-ionizable hydrophobic monomers additionally embrace the vinyl, allyl, and methallyl esters of linear or branched aliphatic carboxylic acids of 2 to 20 carbons, such as vinyl acetate, propionate, butyrate, valerate, hexanoate, 2-ethylhexanoate, decanoate, laurate, and stearate, and the corresponding allyl and methallyl esters. Additional suitable hydrophobic monomers include the vinyl, allyl and methallyl ethers of linear, or branched aliphatic alcohols of 2 to 20 carbons, such as vinyl methyl, ethyl, dodecyl, hexadecyl, and stearyl ethers. Suitable hydrophobic monomers also include olefins and halogenated olefins such as, dicyclopentadiene, ethylene, propylene, 1-butene, 5,5-dimethyl-1-octene, vinyl chloride, or vinylidene chloride.

The hydrophobic third monomer is typically polymerized at from 20 to 75 weight percent based on the total weight percent of the monomer in the chain polymerization, and desirably from 30 to 70 weight percent. A particularly useful amount of hydrophobic third monomer used to prepare the polymer is from 40 to 70 weight percent of the total monomers in the chain polymerization. In one exemplary embodiment, the hydrophobic monomer is an alkylaryl acrylic monomer, such as benzyl methacrylate or benzyl acrylate. The hydrophobic monomer can be a mixture of two or more hydrophobic monomers and can be a mixture of an acrylic and a styrenic monomer, for example, styrene and benzyl methacrylate.

Typical polymer levels in the ink range from 0.1 to 10 wt. percent, suitable from 0.1 to 5 wt. percent, and typically form 0.1 to 3 wt. percent. More than 5% and the viscosity of the inks tends to become a concern from the firing standpoint.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group may be halogen or may be bonded to the remainder of the molecule by an atom of carbon, silicon, oxygen, nitrogen, phosphorous, sulfur, selenium, or boron. The substituent may be, for example, halogen, such as chloro, bromo, or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoy, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group, or a heterocyclic thio group, each of which may be substituted and which contain a 3 to 7 membered heterocyclic ring composed of carbon atoms and at least one hetero atom selected from the group consisting of oxygen, nitrogen, sulfur, phosphorous, or boron, such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents may themselves be further substituted one or more times with the described substituent groups. The particular substituents used may be selected by those skilled in the art to attain desirable properties for a specific application and can include, for example, electron-withdrawing groups, electron-donating groups, and steric groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The ionizable acid groups on the print uniformity improving polymer can be at least partially neutralized (converted into salts) using organic or inorganic bases, typically monovalent inorganic bases, and desirably aqueous alkaline metal hydroxides, selected from potassium hydroxide, sodium hydroxide, rubidium hydroxide, or lithium hydroxide. In one useful embodiment, at least 50 percent of the available acid groups on the print uniformity improving polymer are converted into salts using monovalent inorganic base, more suitably at least 70% and desirably at least 85%, of the available acid groups are converted. From a manufacturing perspective, desirably less than 100% of the acid groups are neutralized as this can lead to lack of control of the pH of the inks. Monovalent inorganic bases are desirable over organic bases such as amines as the neutralizing agents for the print uniformity improving polymers since inks containing polymers neutralized with organic amines can show poor jetting performance in a thermal inkjet printhead.

The print uniformity improving polymers of the present invention typically have a weight average molecular weight less than 100,000, desirably less than 50,000 and in one particular embodiment less than 20,000. Print uniformity improving polymers desirably have a weight average molecular weight above 3,000, more desirably above 5,000 and in one particularly useful embodiment above 8,000. Polymers having weight average molecular weights in the above mentioned ranges are particularly desirable since they jet well from an inkjet printhead and do not cause large increases in viscosity when present in an inkjet ink.

The pigment particles that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system; and (b) a dilution step in which the pigment dispersion from step (a) is diluted with the remaining ink components to give a working strength ink.

The milling step (a) is carried out using any type of grinding mill such as a media mill, ball mill, two-roll mill, three-roll mill, bead mill, air-jet mill; an attritor; or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is present in the milling step (a) in order to facilitate break up of the pigments into primary particles. For the pigment dispersion obtained in step (a) or the ink composition obtained in step (b), a dispersant is present in order to maintain particle stability and prevent settling. The dispersant for the pigment particles can be a monomeric dispersant such as an ionic surfactant, such as for example, potassium oleylmethyl taurate (KOMT), sodium dodecyl sulfate, or sodium dioctyl sulfosuccinate.

Polymeric dispersants may be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794; 5,085,698; 5,519,085; 5,272,201; 5,172,133; 6,043,297; and WO 2004/111140; and graft copolymers, see for example, U.S. Pat. Nos. 5,231,131; 6,087,416; 5,719,204; or 5,714,538. Among these polymeric dispersants, anionic polymeric dispersants are especially useful.

Polymeric dispersants useful for dispersing the pigment particles of the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B, and C blocks is chosen to be the hydrophilic monomer and the remaining blocks are hydrophobic blocks dissimilar from one another.

Polymeric dispersants especially useful in the present invention are copolymers of styrenic monomers and carboxylate monomers. Examples of such dispersants include copolymers of styrene and/or alphamethyl styrene and acrylic acid and/or methacrylic acid (such as the JONCRYL® BASF or TRUDOT® Mead Westvaco polymers) or styrene maleic anhydride and styrene maleic anhydride amic acid copolymers (such as SMA-1440, SMA-17352, SMA-1000, SMA-2000® Sartomer Inc.).

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

Typically, the weight average molecular weight of the polymeric dispersant has an upper limit such that it is less than 50,000 Daltons. Desirably the weight average molecular weight of the copolymer is less than 25,000 Daltons, more desirably it is less than 15,000, and most desirably less than 10,000 Daltons. The copolymer dispersants preferably have a weight average molecular weight lower limit of greater than 500 Daltons.

In one exemplary embodiment, the pigment particles are dispersed with a copolymer where the hydrophobic monomer is benzyl methacrylate and is present from 50 weight percent to 75 weight percent relative to the total weight of the polymeric dispersant, and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and the hydrophilic monomer is methacrylic acid. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate, and methacrylic acid.

Particularly useful polymeric pigment dispersants are further described in US Patent Publication Numbers 2006/0012654 and 2007/0043144, the disclosures of which are incorporated herein by reference.

Encapsulating type polymeric dispersants and polymeric dispersed pigments thereof can also be used in the invention. Specific examples are described in U.S. Pat. Nos. 6,723,785 and 6,852,777; and US Publication Numbers 2004/0132942, 2005/0020731, 2005/0009951, 2005/0075416, 2005/0124726, 2004/0077749, and 2005/0124728, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US Publication Numbers 2003/0199614; 2003/0203988; or 2004/0127639. Microencapsulated-type pigment particles are also useful and consist of pigment particles coated with a resin film; see for example U.S. Pat. No. 6,074,467.

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The inks of the invention may also comprise self-dispersing pigments that are dispersible without the use of a dispersant. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, CAB-O-JET® 200 and CAB-O-JET® 300 (Cabot Corp.) and BONJET® Black CW-1, CW-2, and CW-3 (Orient Chemical Industries, Ltd.).

The pigments used in the ink composition of the invention may be present in any effective amount, generally from 0.1 to 10% by weight, and desirably from 1 to 4% by weight.

Ink compositions useful in the invention can also comprise a humectant in order to achieve high frequency firing with low variability. Representative examples of humectants which may be employed in the present invention include: (1) triols, such as glycerol, 1,2,6-hexanetriol, 2-ethyl-2-hydroxymethyl-propane diol, trimethylolpropane, alkoxlated triols, alkoxylated pentaerytritols, saccharides, and sugar alcohols; and (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, and thioglycol, or a mixture thereof. Typical aqueous-based ink compositions useful in the invention may contain 2-25 weight percent humectant(s), more preferably from about 6-20% humectant, most preferably from about 8-15% humectant.

The ink compositions of the present may also include, in addition to the humectant, a water miscible co-solvent or penetrant. Representative examples of co-solvents used in the aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols, such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based ink compositions useful in the invention may contain 2-10 weight percent co-solvent(s).

Particular humectant and co-solvents useful in the present invention are 1,2-alkane diols (eg. 1,2-hexane diol and 1,2-pentane diol) and lower alkyl glycol ethers (eg. polyethyleneglycol monobutyl ether and diethyleneglycol monomethyl ether). These compounds are advantageous since inks formulated with the inventive polymeric dispersed pigments can provide increased density and reduced mottle when printed onto plain papers. This is an advantage over surfactant dispersed pigments or other polymeric dispersed pigments known in the art since these systems can be destabilized by the high surface activity of the 1,2 alkane diols or alkyl glycol ethers.

Ink compositions of the present invention can comprise one or more multivalent cations such as, for example, calcium, magnesium, nickel, copper, barium, or aluminum. Typical levels of multivalent cations are from 5 to 1000 ppm and desirably from 5 to 100 ppm.

Ink compositions of the present invention can comprise at least one water-dispersible polyurethane compound. "Water-dispersible" is defined herein to include individual polymer molecules or colloidal assemblies of polymer molecules which are stably dispersed in the ink without the need for a dispersing agent. Water dispersible polyurethanes employed in the present invention may have the general formula of (I)

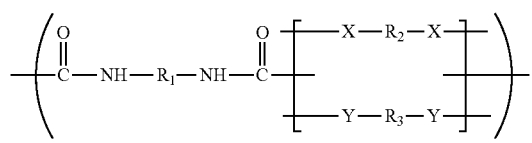

wherein $R_1$ in the structure (I) above is the central portion of the monomer unit that is the polymerization product of a diisocyanate; $R_2$ represents the central portion of a unit that is the polymerization product of at least one type of polyol or, optionally, a polyamine; $R_3$ is the central portion of a unit containing an acid group; and X and Y can be the same or different and are —O— or —N— atom.

$R_1$ is preferably a hydrocarbon group having a valence of two, more preferably containing a substituted or unsubstituted alicyclic, aliphatic, or aromatic group, preferably represented by one or more of the following structures:

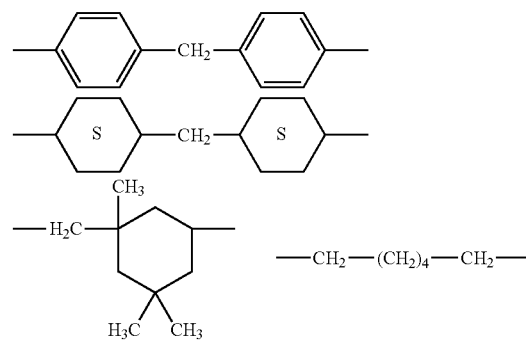

$R_2$ preferably represents a soft segment comprising a prepolymer having ester, carbonate, or ether linkages.

The soft segment is introduced into the polyurethane backbone by using the prepolymer with both ends terminated with a hydroxyl(diol) or an amino(diamine) group. The prepolymer having terminal hydroxyl groups is known as a polyol, and that having terminal amine groups is known as a polyamine. Polyols useful for the practice of the invention include: a) a polyester polyol obtained by, for example, esterification of a dicarboxylic acid with a diol, or ring opening reaction of a lactone and a diol; b) a polycarbonate polyol obtained, for example, by reacting a diols with diaryl carbonates or phosgene, and a polyether diol; c) a polyether polyol as a condensation product of, for example, ethylene glycol, propylene glycol, or tetramethylene glycol. Preferably the polyols have a molecular weight above about 300 and below about 3000. Polyamines useful for the practice of the invention include those sold under the tradename JEFFAMINE® D, ED, and M series from Huntsman. Another more preferred polyether diamine is a polytetrahydrofuran bis(3-aminopropyl) terminated having a molecular weight of about 1,000.

$R_3$ is preferably the central portion of a monomeric unit containing a phosphoric acid, carboxylic acid, or sulfonic acid group, most preferably being carboxylic acids, such as 2,2'-bis(hydroxymethyl)propionic acid, 2,2'-bis(hydroxymethyl)butoric acid, hydroxyethylether of 4,4'-bis(4-hydroxyphenyl)valeric acid. These materials may be prepared by any of the well known techniques in the art of polyurethane manufacture, for example, processes disclosed in U.S. Pat. No. 4,335,029 and in "Aqueous Polyurethane Dispersions," by B. K. Kim, Colloid & Polymer Science, Vol. 274, No. 7 (1996) 599-611 © Steinopff Verlag 1996.

Preferred polyurethanes of this invention have a sufficient amount of acid groups in the molecule to have an acid number from about 50 to about 150, more preferably from about 60 to about 140, and most preferably from about 65 to about 130, wherein, the acid number is defined as the milligrams of potassium hydroxide required to neutralize one gram of polymer. The acid number of the polymer may be calculated by the formula given in the following equation:

Acid number=(moles of acid monomer)*(56 grams/mole)*(1000)/(total grams of monomers)

where, moles of acid monomer is the total moles of all acid group containing monomers that comprise the polymer, 56 is the formula weight for potassium hydroxide, and total grams of monomers is the summation of the weight of all the monomers, in grams, comprising the target polymer.

Polyurethane dispersions useful for the practice of the invention can be prepared by preparing a prepolymer having a relatively low molecular weight and a small excess of isocyanate groups and chain-extending with a chain extender the prepolymers into a high molecular weight polyurethane during the dispersion process. Such processes have been disclosed in, for example, U.S. Pat. No. 4,335,029; in "Aqueous Polyurethane Dispersions," by B. K. Kim, Colloid & Polymer Science, Vol. 274, No. 7 (1996) 599-611 © Steinopff Verlag 1996; and in "Polyurethane Dispersion Process," by Mania et al. Paint and Coating Industry, January 2007, Page 30.

Preferred diamine chain extenders for the practice of the invention include ethylene diamine, dietbylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine. 2,6-diaminopyridine, 4,4'-diamino diphenylmethane, adducts of diethylene triamine with acrylate or its hydrolyzed products, hydrazine, and substituted hydrazines.

The polyurethane dispersions useful for the practice of this invention can also be prepared without involving the chain-extension step during the dispersion step. In the process the chemical reaction for forming urethane or urea linkages is completed prior to the dispersion step.

The polyurethane of this invention typically will have a minimum molecular weight of at least 8,000. Suitably, the polyurethane has a maximum molecular weight of 150,000. Desirably, the molecular weight of the polyurethane is from 10,000 to 100,000, and is suitably from 15,000 to 50,000. The polyurethane dispersions useful for the practice of this invention suitably have a mean particle size of less than 100 nm and more typically less than 50 nm.

Polyurethanes useful in the present invention are further described in US Publication Numbers 2004/0085419 and 2006/0100306 and unpublished U.S. patent application Ser. Nos. 12/029,929, 12/029,972, and 61/016,991.

Inks of the present invention can be printed as photographic quality digital images having uniform print qualities if a suitable recording medium, such as a photo quality microporous recording medium is used. Microporous recording media are typically comprised of fine particles or powders mixed with a polymeric hydrophilic binder to form a water-absorbing microporous structured coating. The hydrophilic particles or powders are typically polycrystalline inorganic materials such as boehmite alumina, porous and non-porous silicas (for example SYLOJET or LUDOX particles) or amorphous inorganic materials such as aluminum silicates. Microporous photoglossy recording media are preferred due to their relatively quick drying capabilities and improved water-fastness and smudge resistance compared to swellable media. The design of microporous recording media vary widely depending on materials and paper manufacturing processes and should not be construed to limit the scope of the present invention.

However, for the purposes of the invention the interaction between the microporous photoglossy recording medium and the ink pigment and polymeric binder components should be such that the aforementioned ink components are substantially retained on the surface of the media. Penetration of the pigment colorant, which can occur if the pore size of the medium significantly exceeds the pigment particle size, results in penetration of the colorant below the surface of the medium with a concomitant loss of density. Ink pigment particle size can range from 5 nm to 200 nm, with a preferred range of 10 nm to 100 nm. The corresponding media pore size, as determined by mercury intrusion porosimetry, can range from 5 nm to 500 nm, with a preferred range of from 10 nm to 50 nm. A media pore size in excess of 500 nm results in a matte appearance, not in keeping with the requirement for a gloss print. A preferred ratio of pigment-to-pore size, in keeping with pigment colorant retention on the surface of the medium, is from 0.01 to 100, and is preferably in the range of from 0.2 to 2.0.

The surface pH of the ink recording medium is an important metric and is determined in the following manner. A sample of the media is placed on a flat surface and 0.1 gm of 0.3M $KNO_3$ is placed on the media sample with a micropipet. The pH is determined using a VWR Scientific pH meter Model #8005 equipped with an Orion Flat bottom Electrode Model #913600. The electrode is brought into contact with the liquid residing on the surface of the medium, and the pH recorded when the instrument indicates that the reading is stable. In one embodiment of the present invention the ink composition comprising the print uniformity improvement is printed onto a microporous photoglossy recording medium having a surface pH of less than 7.0. In another embodiment, the ink composition is printed onto a microporous glossy recording medium having a surface pH of less than or equal to 5, and in one particularly useful embodiment the surface pH of the recording medium is less than or equal to 3. Recording media having a surface pH of less than or equal to 5 are especially desirable since pigment based images containing the print uniformity improving polymers of the present invention on such media are particularly advantaged from a durability aspect, including both wet and dry abrasion resistance. In yet another embodiment, the microporous photoglossy recording medium is alumina-based. Alumina-based is defined herein to mean the recording medium comprises at least one ink receptive layer that contains colloidal alumina particles. In one particularly useful embodiment, the outermost layer of the recording medium comprises colloidal alumina particles.

Alternative embodiments of the invention may provide reduced bleed, smearing, and sensitivity to extremes of humidity, improved manufacturability, transport through a printer, image quality, dry time, color density, gloss, abrasion and scratch resistance, resistance to cracking, layer adhesion, water-fastness, image stability, resistance to image fade attributable to ambient gases or visible or UV light exposure, reduced gloss artifacts, such as differential gloss and color gloss, and reduced curl during manufacturing, storage, printing, or drying.

The invention is summarized above. Inkjet printing systems useful in the invention comprise a printer, at least one ink, and an image recording element, typically a sheet (herein also "media"), suitable for receiving ink from an inkjet printer. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation, or an actuator that is made to move.

Drop-on-demand (DOD) liquid emission devices have been known as ink printing devices in ink jet printing systems for many years. Early devices were based on piezoelectric actuators such as are disclosed U.S. Pat. Nos. 3,946,398 and 3,747,120. A currently popular form of ink jet printing, thermal ink jet (or "thermal bubble jet"), uses electrically resistive heaters to generate vapor bubbles which cause drop emission, as is discussed in U.S. Pat. No. 4,296,421. In another process, known as continuous inkjet, a continuous stream of droplets is generated, a portion of which are deflected in an imagewise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; and 6,517,197.

FIG. 1 shows one schematic example of an inkjet printer 10 that includes a protective cover 40 for the internal components of the printer. The printer contains a media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording medium supply 20 in a media supply tray to a region where the printhead 30 deposits droplets of ink onto the media sheet. The printed media collection 22 is accumulated in an output tray.

Figure 2:
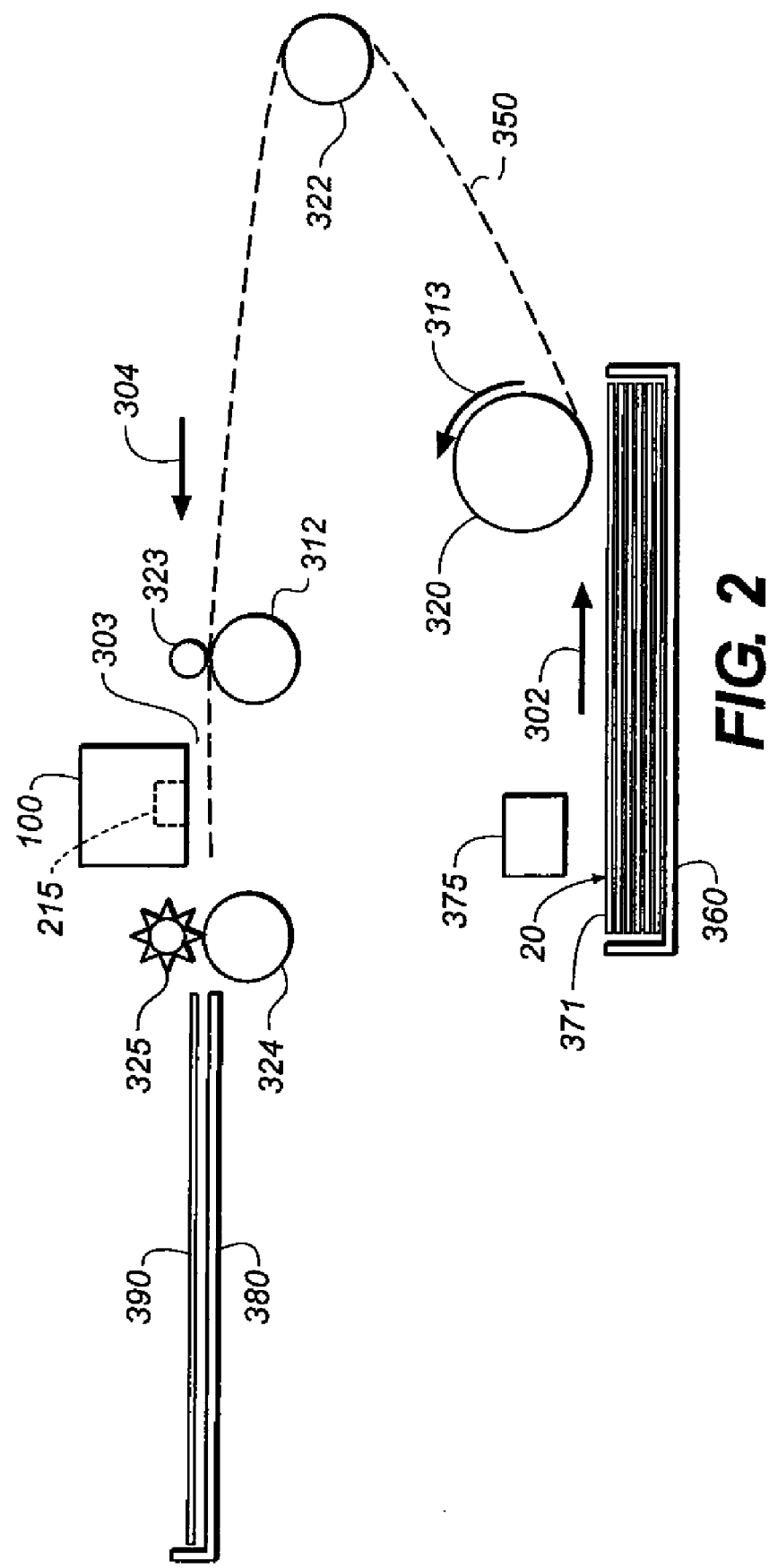
FIG. 2 is a schematic diagram showing the flow of media from the supply tray to the collection tray.

FIG. 2 shows schematically how the inkjet printer comprises a variety of rollers to advance the media sheet, for example paper, through the printer, as shown schematically in the side view of FIG. 2. In this example, a pickup roller 320 moves the top media sheet 371 of a recording medium supply 20 that is located in a media supply tray 360 in the direction of arrow 302. A turn roller 322 acts to move the media sheet 371 around a C-shaped path 350 (in cooperation with a curved surface—not shown) so that the media sheet continues to advance along direction arrow 304 in the printer. The media sheet 371 is then moved by feed roller 312 and idler roller(s) 323 to advance along direction 304 across the print region 303 and under printer carriage 100. A discharge roller 324 and star wheel(s) 325 transport the printed media sheet 390 along direction 304 and to an output tray 380. For normal media pick-up and feeding, it is desired that all driven rollers rotate in forward direction 313. An optional sensor 215 capable of detecting properties of the media sheet or indicia contained thereon can be mounted on the carriage 100. A further optional sensor 375 capable of detecting properties of the media sheet or indicia contained thereon may be positioned facing the front or back surface of the media sheet 371 and located at any advantageous position along the media transport path 350 including the media supply tray 360. Alternatively, the inkjet printing system comprises a printer supplied with a continuous roll of ink recording medium that may be cut to individual prints subsequent to printing.

Different types of image-recording elements (media) vary widely in their ability to absorb ink. Inkjet printing systems provide a number of different print modes designed for specific media types. A print mode is a set of rules for determining the amount, placement, and timing of the jetting of ink droplets during the printing operation. For optimal image reproduction in inkjet printing, the printing system must match the supplied media type with the correct print mode. The printing system may rely on the user interface to receive the identity of the supplied media, or an automated media detection system may be employed. A media detection system comprises a media detector, signal conditioning procedures, and an algorithm or look-up table to decide the media identity. The media detector may be configured to sense indicia present on the media comprising logos, patterns, and the like corresponding to media type, or may be configured to detect inherent media properties, typically optical reflection. The media detector may be located in a position to view either the front or back of the media sheet, depending on the property being detected. As exemplified in FIG. 2, the media detector 375 may be located to view the media sheet 371 in the media supply tray 360 or along the media transport path 350. Alternatively, optical sensor 215 may be located at the print region 303. Usefully, the media comprise a repeating pattern detectable by the method described in U.S. Pat. No. 7,120,272. Alternatively, a number of media detection methods are described in U.S. Pat. No. 6,585,341.

Figure 3:
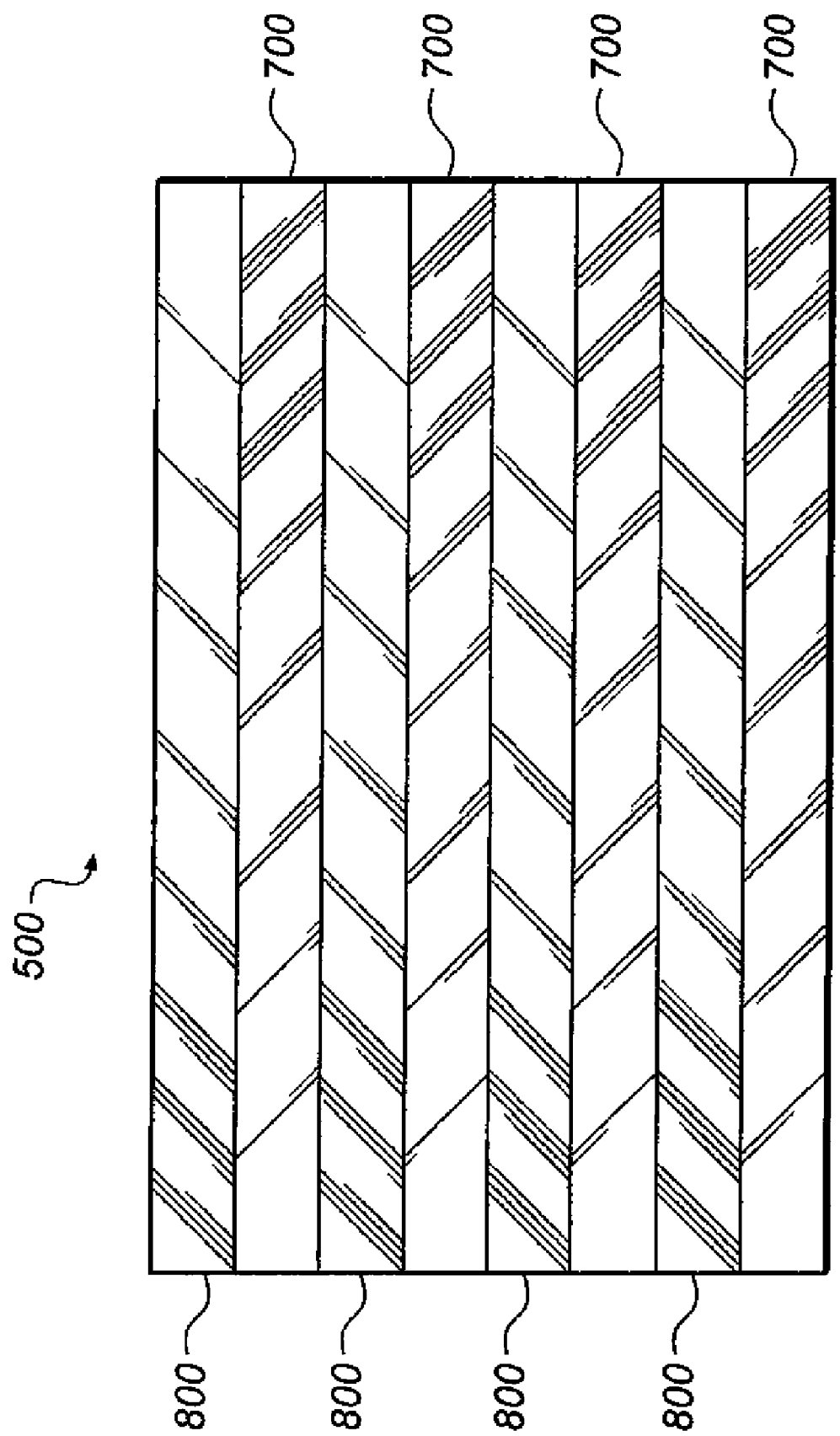
FIG. 3 is a schematic diagram showing a printed image exhibiting gloss-banding where the variation in density in the diagram corresponds to a variation in reflectivity, i.e. low density=high reflectivity and conversely.

FIG. 3 shows a schematic representation of an imaged inkjet recording medium that exhibits gloss-banding 500 in the imaged area of the medium. Gloss-banding is defined by two types of gloss bands, 700 and 800 within the image. Gloss band 800 corresponds to a band having a high gloss area on the left side of the image that continuously decreases in gloss to an area of low gloss on the right side of the image. Conversely, gloss band 700 corresponds to a band having a low gloss area on the left side of the image that continuously increases in gloss to an area of high gloss on the right of the image. The gloss-banding artifact consists of alternating bands of 700 and 800 in a repeating pattern.

EXAMPLES

Polymers for Gloss-Banding Evaluations

Comparative Polymer, BzMA 50/50: A random copolymer containing 50% by weight of benzylmethacrylate (Bz) and 50% by weight of methacrylic acid (MA), where 85% of the acid groups have been neutralized with potassium hydroxide. The corresponding mole fractions are: (Bz)=0.33, (MA)= 0.67, and prior to neutralization the Total Mole Fraction of Acid Monomers, (TMFAM), TMFAM=[(MA)+(AMPS)]= [(0.67)+(0.00)]=0.67.

Comparative Polymer, BzMA 67/33: A random copolymer containing 67% by weight of benzylmetbacrylate (Bz) and 33% by weight of methacrylic acid (MA), where 85% of the acid groups have been neutralized with potassium hydroxide. The corresponding mole fractions are: (Bz)=0.50, (MA)= 0.50, and prior to neutralization, TMFAM=[(MA)+ (AMPS)]= 0.50.

Inventive Polymer, BzMAAMPS 62/33/5: A random terpolymer containing 62% by weight of benzylmethacrylate (Bz), 33% by weight of methacrylic acid (MA) and 5% by weight of 2-acrylamido-2-methyl propane sulfonic acid (AMPS), where 85% of the acid groups have been neutralized with potassium hydroxide. The corresponding mole fractions are: (Bz)=0.46, (MA)=0.50, (AMPS)=0.04, and prior to neutralization, TMFAM=[(MA)+(AMPS)]=0.54.

Inventive Polymer, BzMAAMPS 57/33/10: A random terpolymer containing 57% by weight of benzylmethacrylate (Bz), 33% by weight of methacrylic acid (MA) and 10% by weight of 2-acrylamido-2-methyl propane sulfonic acid (AMPS), where 85% of the acid groups have been neutralized with potassium hydroxide. The corresponding mole fractions are: (Bz)=0.43, (MA)=0.51, (AMPS)=0.06, and prior to neutralization, TMFAM=[(MA)+(AMPS)]=0.57.

Inventive Polymer, BzMAAMPS 47/33/20: A random terpolymer containing 47% by weight of benzylmethacrylate (Bz), 33% by weight of methacrylic acid (MA) and 20% by weight of 2-acrylamido-2-methyl propane sulfonic acid (AMPS), where 85% of the acid groups have been neutralized with potassium hydroxide. The corresponding mole fractions are: (Bz)=0.36, (MA)=0.51, (AMPS)=0.13, and prior to neutralization, TMFAM=[(MA)+(AMPS)]=0.64.

Polyurethane: A polymer prepared from the reaction of isophorone diisocyante, polycarbonate diol and bis-hydroxylmethyl proprionic acid. The polyurethane has a sufficient number of acid groups to provide an acid number of 76 where 85% of the acid groups have been neutralized with potassium hydroxide.

Comparative Inkset A

A set of five inks was made according to Table 2.

TABLE 2

COMPARISON INKS

| Ingredient | Cyan | Magenta | Yellow | Photo Black | Protective |
|---|---|---|---|---|---|
| Pigment (dispersed with 30 wt % KOMT*) | 2.2 PB15:3 | 3.0 PR122 | 2.75 PY155 | 2.5 PK7 | none |
| Glycerol | 7 | 6.5 | 7.33 | 7 | 12 |
| 1,2-pentanediol | 3 | 2.25 | 2.25 | | 2.25 |
| 1,5-pentanediol | 5 | 6.5 | 4.33 | 4 | |
| Triethlyene glycol | | 2 | | | |
| Ethylene glycol | | | | | 6 |
| Surfynol 465 | 1 | 0.75 | | | |
| Tergitol 15-S-5 | | | 0.5 | | 0.75 |
| Strodex PK-90 | | | | 0.3 | |
| Triethanolamine | | | | 0.05 | |
| BzMA 67/33 | 1.3 | 1.0 | 0.9 | 0.9 | 0.8 |
| Polyurethane | 1.2 | 1.2 | 1.2 | 1.2 | 1.6 |
| Kordek MLX | 0.02 | 0.02 | 0.02 | 0.02 | 0.02 |
| HP Water | To 100 | To 100 | To 100 | To 100 | To 100 |

*KOMT is the potassium salt of oleylmethyl taurate (anionic dispersant)

Inventive Examples

Three additional full-color sets of ink were made according the identical ink formulations from Table 2 except that BzMA 67/33 was replaced with inventive polymers shown in Table 3.

TABLE 3

INVENTIVE INK SETS B THROUGH D

| Inkset: Auxiliary Polymer | Cyan | Magenta | Yellow | Photo Black | Protective |
|---|---|---|---|---|---|
| B: Bz/MA/AMPS (62/33/5) | 1.3 | 1.0 | 0.9 | 0.9 | 0.8 |
| C: Bz/MA/AMPS (57/33/10) | 1.3 | 1.0 | 0.9 | 0.9 | 0.8 |
| D: Bz/MA/AMPS (47/33/20) | 1.3 | 1.0 | 0.9 | 0.9 | 0.8 |

The ingredients were mixed, stirred for an hour, filtered through a 1.2 micron syringe filter and loaded into cartridges for a Kodak 5300 AIO Inkjet Printer.

Preparation of Banding Targets

Printing was carried out on an experimental Kodak printer. Modifications of both the printer hardware and software enabled control over the firing of individual nozzles, control over the speed of head travel, and control over the paper advance after each swath. A standard printhead from a Kodak Easyshare printer was used, which enabled single swaths 0.533 inches in width to be printed.

Gloss-banding targets were printed on the above experimental printer, using a five-pass, bidirectional printing mode, with a roughly equal fraction of ink printed in each pass of the printhead. Total ink laydown on the target was 16.7 mL/m2. A single color of ink, either magenta or photo-black was used for each target. The recording medium sheet was advanced ⅕ of a head width after each pass. Targets consisted of 24 such passes, each approximately 6 inches long. For systems in which gloss-banding occurs, this printing sequence results in a series of bands of varying gloss, each approximately 0.11 inches wide. Targets were printed onto two variations of a glossy microporous alumina-based inkjet recording medium. One recording medium variation was untreated, and had a surface pH of approximately 5.0; the other had been pretreated with a dilute hydrochloric acid solution and then dried, and had a surface pH of approximately 3.0.

Formulation for Glossy Microporous Alumina-Based Recording Medium

An inkjet recording medium was prepared on a polyethylene resin-coated (RC) paper support. The RC paper carried a backprint comprising diagonal lines of infrared absorbing ink for purposes of media identification in a printer equipped to detect the line spacing. On the front side of the support were coated three layers in order from the support, a foundation layer, an intermediate layer and a top layer. The foundation layer composition comprised colloidal alumina particles (CATAPAL 200, Sasol, 140 nm particles), binder poly(vinyl alcohol) GH-23, (Gohsenol), crosslinkers glyoxal (CATABOND GHF) and boric acid, OLIN 10 G (Dixie Chemicals) and APG 325 (Congnis), coated at 6.5 g solids/m2 in a relative ratio of 89.7/8.9/0.24/0.11/0.17/0.84. The intermediate layer comprised colloidal alumina particles (CATAPAL 200, Sasol, 140 nm particles), binder poly(vinyl alcohol) (GH-23, Gohsenol), crosslinkers glyoxal (CARTABOND GHF) and boric acid, and surfactants (OLIN 10 G and APG 325) coated at 60 g solids/m2 in a relative ratio of 95.3/4.5/0.12/0.12. The top layer comprised fumed alumina particles (PG-008, Cabot, 130 nm particles), binder poly(vinyl alcohol (GH-23, Gosenol), surfactant (ZONYL FSN), and crosslinker boric acid coated at 2.2 g/m2 in a relative ratio of 89.3/5.0/5.5/0.14.

Evaluation of Banding Targets

Banding targets were evaluated visually by positioning them approximately seven feet from a standard 4-foot long fluorescent bulb and holding them at an angle such that specular and near-specular reflection could be observed. Viewing distance was approximately 1 foot. These conditions are such that banding can be seen readily. The targets were ranked for banding on a scale of 1-5, where: 5=very severe banding, 4=severe banding, 3=modest banding, 2=slight banding, and 1=no visible banding. Results are shown in Table 4.

TABLE 4

VISUAL ASSESSMENT AND SCORING OF GLOSS-BANDING

| Example | % AMPS in polymer | Color | Banding score, pH 5 media | Banding score, pH 3 media |
|---|---|---|---|---|
| Comparative 1 | 0 | Magenta | 2 | 4 |
| Comparative 2 | 0 | Photo-Black | 2 | 4 |
| Inventive 1 | 5 | Magenta | 2 | 3 |
| Inventive 2 | 5 | Photo-Black | 2 | 3 |
| Inventive 3 | 10 | Magenta | 1 | 3 |
| Inventive 4 | 10 | Photo-Black | 1 | 3 |
| Inventive 5 | 20 | Magenta | 1 | 1 or 2* |
| Inventive 6 | 20 | Photo-Black | 1 | 1 |

*This target was difficult to judge. If banding was present at all it was very slight.

The above data show that, for both magenta and photo-black targets, banding for the each of the inventive examples was less than or equal to that of the comparative example on pH 5 media, and in fact was not visible at all for polymers containing 10% and 20% by weight of the sulfonated monomer AMPS. On the pH 3 media, for both colors, banding of all the inventive examples was less than that of the comparative example, and disappeared completely or nearly completely, for the polymer containing 20% sulfonated monomer.

Comparison of Bz/MA/AMPS (47/33/20) to Bz/MA (50/50) as Ink Addenda

The following example compares inks made with an inventive polymer to inks made with a comparative polymer having a similar total mole fraction of acid monomers (TMFAM). Comparison magenta and photo black inks were made according to the formulae for the magenta and photo black inks in Comparative Ink Set A except that BzMA (50/50) was used at the same weight percent instead of BzMA (67/33). These were compared to the Inventive magenta and photo black inks from Inventive Ink Set D above.

Magenta and photo-black targets were printed as described above, onto a glossy microporous alumina-based inkjet recording medium that had been pre-treated with a dilute hydrochloric acid solution and then dried, and had a surface pH of approximately 3.0. Targets were compared for banding using the lighting and viewing arrangement described above.

Evaluation of Mottle Targets

Mottle measurements were made using the same targets that were used for gloss-banding analyses. Targets were analyzed with a PIAS-II handheld image analyzer from Quality Engineering Associates, Inc., Burlington, Mass. 01803. The low magnification head on the instrument was used in conjunction with the Area Analysis software to read L* mottle, which is the standard deviation of L* values within the region of interest, using a tile size of 413 microns square. Because the low L* values of the black targets led to low and uncertain values of L* mottle, values for the black targets were not included. Values greater than 1.2 correspond to easily visible non-uniformity in the printed region at normal viewing distance, and values less than about 1.2 have acceptable visual uniformity at normal viewing distance.

For both magenta and photo-black targets, the inventive examples (BzMAAMPS (47/33/20) addendum) showed significantly less gloss-banding than the comparative examples (BzMA (50/50) addendum). Mottle in the magenta targets was significantly improved with the inventive example, see Table 5. This result demonstrates that, even at comparable total mole fraction of acid monomers, TMFAM=0.65+/−0.2, the inventive example is advantaged over the comparative example for gloss-banding and mottle.

TABLE 5

VISUAL ASSESSMENT AND SCORING OF GLOSS-BANDING

| Example | Color | Banding Score | Mottle |
|---|---|---|---|
| Bz/MA(50/50), comparative example | Magenta | 5 | 1.49 |
| Bz/MA(50/50), comparative example | Photo-black | 4 | — |
| Bz/MA/AMPS (47/33/20), inventive example | Magenta | 3 | 0.79 |
| Bz/MA/AMPS (47/33/20), inventive example | Photo-black | 3 | — |

The above data demonstrate that the advantageous performance of the print uniformity polymers of the invention is not due merely to the total number of ionizable acid groups, but rather to the pKa difference between the first and second monomer.

In the following section gloss-banding was evaluated in the following manner. Each of the prepared inks were individually printed onto an alumina micro-porous glossy recording medium, having a surface pH of 5.0, using a 5 pass bidirectional print mode. The target printed was a roughly 5 inch square patch having total ink laydown of 16.7 ml/m2, with a roughly equal fraction printed in each pass of the printhead, Gloss-banding could be observed with careful observation of these samples in specular or near specular orientation.

A quantitative evaluation of the gloss-banding in the prints was obtained by orienting the prints so that a broad, diffuse light source is positioned approximately at a 45 degree angle relative to the print surface, and recording the specular reflectance with a camera positioned at the complementary 45 degree angle relative to the target print surface. The print was held flat with an electrostatic base, and the camera and light source distances were such that the image of the light source approximately filled the area of the target. The camera was focused on the target and an image obtained. The distances, angles, and camera settings were held constant while the target images were exchanged on the electrostatic holder and imaged one at a time.

The image files were read into MATLAB® (The MathWorks Inc.) and processed as follows. The image was subdivided into narrow strips, extending across the image, perpendicular to the visible bands. The camera code values for these strips were averaged along the direction parallel to the gloss bands, and a slowly varying baseline representing the illumination and capture variation was subtracted. The gloss bands were now represented by alternating positive and negative regions in the data vector. An autocorrelation function was used to estimate the frequency (and wavelength) of the bands. Successive regions down the length of the vector of equal length to the band wavelength were added to increase signal to noise and remove variation due to recording medium defects. The resulting signal represents the gloss-banding profile, and is given a value by summing the square of the values of the signal, and taking the square root of the resultant value. This banding signal is evaluated for each of the subdivided narrow strips, and the strip with the largest banding signal is selected for each patch, and listed in Table 7. Note that the strongest gloss-banding is seen at the edge of the patch, so the selected strip is near the top of the target for each of the targets/inks listed in Table 7.

Photo Black Ink Examples

A series of 36 inks (1A through 12C) were made according to the comparative photo black ink in Table 1 except that the levels of polyurethane and auxiliary polymer were varied according to Table 6.

TABLE 6

PHOTO BLACK INK EXAMPLES

| Ink ID | Weight % Polyurethane | Weight % BzMAAMPS |
|---|---|---|
| 1 | 1.2 | 1.8% Bz/MA (67/33) |
| 2 | 1.2 | 1.8% Bz/MA/AMPS (62/33/5) |
| 3 | 1.2 | 1.8% Bz/MA/AMPS (57/33/10) |
| 4 | 1.2 | 1.8% Bz/MA/AMPS (47/33/20) |
| 5 | 2.4 | 1.8% Bz/MA (67/33) |
| 6 | 2.4 | 1.8% Bz/MA/AMPS (62/33/5) |
| 7 | 2.4 | 1.8% Bz/MA/AMPS (57/33/10) |
| 8 | 2.4 | 1.8% Bz/MA/AMPS (47/33/20) |

Results are tabulated in Table 7.

TABLE 7

BANDING RESULTS

| Sample | Wt % Polyurethane | Bz/MA/AMPS Total % in ink | AMPS wt % in polymer | Banding Signal |
|---|---|---|---|---|
| 1C | 1.2 | 1.8 | 0 | 0.25 |
| 2 | 1.2 | 1.8 | 5 | 0.20 |
| 3 | 1.2 | 1.8 | 10 | 0.10 |
| 4 | 1.2 | 1.8 | 20 | 0.06 |
| 5C | 2.4 | 1.8 | 0 | 0.20 |
| 6 | 2.4 | 1.8 | 5 | 0.14 |
| 7 | 2.4 | 1.8 | 10 | 0.12 |
| 8 | 2.4 | 1.8 | 20 | 0.10 |

Particularly advantageous ink compositions of the invention are samples 2, 3, and 4 vs control ink composition 1C, and ink compositions of the invention 6, 7, and 8 vs control composition 5C.

The invention has been described in detail with particular reference to certain preferred embodiments thereof, but it will be understood that variations and modifications can be effected within the spirit and scope of the invention. The entire content of the patents and publications referred to in the document are incorporated herein by reference.

PARTS LIST

| | |
|---|---|
| 10 | inkjet printer |
| 12 | image data source |
| 18 | ink tanks |
| 20 | recording medium supply |
| 22 | printed media collection |
| 30 | printhead |
| 40 | protective cover |
| 100 | carriage |
| 215 | optical sensor |
| 302 | media direction |
| 303 | print region |
| 304 | media direction |
| 313 | forward direction |
| 320 | pickup roller(s) |
| 322 | turn roller(s) |
| 323 | idler roller(s) |
| 324 | discharge roller(s) |
| 325 | star wheel(s) |
| 360 | media supply tray |
| 371 | media sheet |
| 375 | further optical sensor |
| 380 | media output tray |
| 390 | printed media sheet |
| 500 | imaged recording medium having gloss bands |
| 700 | gloss band |
| 800 | gloss band |

The invention claimed is:

1. An inkjet printing system comprising a printer, at least one ink, and an image recording element, wherein the at least one ink comprises an ink containing:
   A) a print uniformity improving polymer obtained by chain copolymerizing at least the following ethylenically unsaturated monomers:
      (a) a first monomer having a lowest pKa value greater than 3 and comprising a carboxylic acid group;
      (b) a second monomer having a lowest pKa value less than 2; and
      (c) a hydrophobic third monomer;
   B) pigment particles that are self-dispersed or dispersed with a dispersant other than a print uniformity improving polymer, and
   C) water.

2. An inkjet ink composition comprising:
   A) a print uniformity improving polymer obtained by chain copolymerizing at least the following ethylenically unsaturated monomers:
      (a) a first monomer having a lowest pKa value greater than 3 and comprising a carboxylic acid group;
      (b) a second monomer having a lowest pKa value less than 2; and
      (c) a hydrophobic third monomer;
   B) pigment particles that are self-dispersed or dispersed with a dispersant other than a print uniformity improving polymer, and
   C) water.

3. The inkjet ink composition of claim 2, wherein the first monomer is selected from methacrylic acid and acrylic acid.

4. The inkjet ink composition of claim 2, wherein the print uniformity improving polymer contains, as polymerized units, from 20 to 75 percent by weight of the first monomer.

5. The inkjet ink composition of claim 2, wherein the second monomer contains a sulfonic acid group or salt thereof.

6. The inkjet ink composition of claim 2, wherein the print uniformity improving polymer contains as polymerized units from 5 to 50 percent by weight of the second monomer.

7. The inkjet ink composition of claim 2, wherein the hydrophobic third monomer is an acrylate or a methacrylate.

8. The inkjet ink composition of claim 7, wherein the hydrophobic third monomer is a benzylacrylate or a benzylmethacrylate.

9. The inkjet ink composition of claim 2, wherein the print uniformity improving polymer contains as polymerized units from 20 to 75 percent by weight of the hydrophobic third monomer.

10. The inkjet ink composition of claim 9, wherein the print uniformity improving polymer contains as polymerized units from 40 to 70 percent by weight of the hydrophobic third monomer.

11. The inkjet ink composition of claim 2, wherein the ink further comprises a water-dispersible polyurethane.

12. The inkjet ink composition of claim 2, wherein the pigment particles are dispersed with an anionic polymeric dispersant.

13. The inkjet ink composition of claim 2, wherein the pigment particles are dispersed with an anionic monomeric dispersant.

14. The inkjet ink composition of claim 2, comprising up to 10 wt % of the print uniformity improving polymer.

15. The inkjet ink composition of claim 2, comprising at least 1.2 wt % of the print uniformity improving polymer.

16. The inkjet ink composition of claim 2, wherein the molecular weight (weight average) of the print uniformity improving polymer is from 3,000 to 50,000.

17. A method for printing an inkjet image comprising:
   I) providing an aqueous inkjet ink comprising:
      A) a print uniformity improving polymer obtained by chain copolymerizing at least the following ethylenically unsaturated monomers:
         (a) a first monomer having a lowest pKa value greater than 3 and comprising a carboxylic acid group;
         (b) a second monomer having a lowest pKa value less than 2; and
         (c) a hydrophobic third monomer;
      B) pigment particles that are self-dispersed or dispersed with a dispersant other than a print uniformity improving polymer, and
      C) water;

II) providing a porous recording medium having a surface pH less than 7; and

III) jetting the inkjet ink in the form of ink drops onto the porous recording medium to form a printed image.

18. The printing method of claim 17, wherein the porous recording medium has a surface pH less than or equal to 5.

19. The printing method of claim 18, wherein the porous recording medium has a surface pH less than or equal to 3.

20. The printing method of claim 17, wherein the porous recording medium is a microporous photoglossy recording medium.

21. The printing method of claim 17, wherein at least one ink receiving layer of the recording medium comprises colloidal alumina particles.

* * * * *